(12) United States Patent
Jacobson et al.

(10) Patent No.: US 10,878,196 B2
(45) Date of Patent: Dec. 29, 2020

(54) SENTIMENT ANALYSIS TUNING

(71) Applicant: AT&T Intellectual Property I, L.P., Atlanta, GA (US)

(72) Inventors: Guy Jacobson, Bridgewater, NJ (US); Wen-Ling Hsu, Bridgewater, NJ (US); Tan Xu, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 182 days.

(21) Appl. No.: 16/149,770

(22) Filed: Oct. 2, 2018

(65) Prior Publication Data

US 2020/0104368 A1 Apr. 2, 2020

(51) Int. Cl.
*G06F 40/30* (2020.01)
*G06F 16/31* (2019.01)
*G06N 20/00* (2019.01)

(52) U.S. Cl.
CPC ............ *G06F 40/30* (2020.01); *G06F 16/313* (2019.01); *G06N 20/00* (2019.01)

(58) Field of Classification Search
CPC .... G06F 16/313; G06F 40/30; G06F 17/2785; G06F 17/30616; G06N 20/00; G06N 99/005
See application file for complete search history.

(56) References Cited

U.S. PATENT DOCUMENTS

| 7,788,087 | B2   | 8/2010 | Corston-Oliver et al. |
| 8,412,530 | B2 * | 4/2013 | Pereg ............... G06F 40/35 704/270 |
| 8,463,595 | B1   | 6/2013 | Rehling et al. |
| 8,515,739 | B2   | 8/2013 | Godbole et al. |

(Continued)

FOREIGN PATENT DOCUMENTS

| WO | 2015005662 A1 | 1/2015 |
| WO | 2016122532 A1 | 8/2016 |

OTHER PUBLICATIONS

Whitelaw, Casey, Navendu Garg, and Shlomo Argamon. "Using appraisal groups for sentiment analysis." Proceedings of the 14th ACM international conference on Information and knowledge management. ACM, 2005. https://www.researchgate.net/profile/Shlomo_Argamon/publication/200044325_Using_appraisal_groups_for_sentiment_analysis/links/0deec518fbe4483117000000/Using-appraisal-groups-for-sentiment-analysis.pdf.

(Continued)

*Primary Examiner* — Angela A Armstrong

(57) ABSTRACT

In one example, the present disclosure describes a device, computer-readable medium, and method for sentiment analysis tuning. In one example, the method includes acquiring a first sentiment analysis-generated score for a first string of text, wherein the first string of text includes a first plurality of words, and wherein the first sentiment analysis-generated score is calculated using a set of first values associated with the first plurality of words, calculating a second value for at least one word of the first plurality of words, based on a non-sentiment-analysis generated score associated with the first string of text, acquiring a second string of text, wherein the second string of text includes a second plurality of words, and wherein the second plurality of words includes the at least one word, and calculating a sentiment analysis-generated score for the second string of text, using the second value for the at least one word.

20 Claims, 4 Drawing Sheets

(56) References Cited

U.S. PATENT DOCUMENTS

| | | |
|---|---|---|
| 8,554,701 B1 | 10/2013 | Dillard et al. |
| 8,682,649 B2 | 3/2014 | Bellegarda |
| 8,694,357 B2 | 4/2014 | Ting et al. |
| 8,838,438 B2 | 9/2014 | Leary et al. |
| 9,134,215 B1 | 9/2015 | Vignisson et al. |
| 9,633,008 B1 | 4/2017 | Brand et al. |
| 9,704,097 B2 | 7/2017 | Devarajan et al. |
| 9,799,035 B2 | 10/2017 | Cama et al. |
| 9,965,443 B2 | 5/2018 | Eggink et al. |
| 2008/0249764 A1 | 10/2008 | Huang et al. |
| 2012/0278064 A1* | 11/2012 | Leary ............... G06F 40/253 704/9 |
| 2014/0067370 A1* | 3/2014 | Brun ................. G06F 40/30 704/9 |
| 2014/0172415 A1 | 6/2014 | Jo |
| 2014/0214408 A1 | 7/2014 | Bhatt |
| 2014/0343923 A1 | 11/2014 | Heilman et al. |
| 2015/0286627 A1 | 10/2015 | Chang et al. |
| 2016/0062967 A1 | 3/2016 | Cantarero et al. |
| 2016/0210354 A1 | 7/2016 | Wijnen et al. |
| 2016/0307114 A1 | 10/2016 | Ghosh et al. |
| 2017/0060996 A1 | 3/2017 | Das |
| 2017/0061454 A1 | 3/2017 | Bao et al. |
| 2017/0124575 A1 | 5/2017 | Clark et al. |
| 2017/0249389 A1 | 8/2017 | Brovinsky et al. |
| 2018/0075476 A1* | 3/2018 | Asaftei ............. G06Q 30/0244 |
| 2018/0246880 A1 | 8/2018 | Woods-Holder |

OTHER PUBLICATIONS

Taboada, Maite, et al. "Lexicon-based methods for sentiment analysis." Computational linguistics 37.2 (2011): 267-307. https://www.mitpressjournals.org/doi/pdf/10.1162/COLl_a_00049.

Maas, Andrew L., et al. "Learning word vectors for sentiment analysis." Proceedings of the 49th annual meeting of the association for computational linguistics: Human language technologies–vol. 1. Association for Computational Linguistics, 2011. https://ai.stanford.edu/~ang/papers/acl11-WordVectorsSentimentAnalysis.pdf.

Jain, Tejashri Inadarchand, and Dipak Nemade. "Recognizing contextual polarity in phrase-level sentiment analysis" International Journal of Computer Applications (0975-8887), vol. 7, No. 5, Sep. 9, 2010. https://pdfs.semanticscholar.org/157d/40d3e7fba266544cbbfd5f84852ddd944f8b.pdf.

Dos Santos, Cicero, and Maira Gatti. "Deep convolutional neural networks for sentiment analysis of short texts." Proceedings of COLING 2014, the 25th International Conference on Computational Linguistics: Technical Papers. 2014. http://www.aclweb.org/anthology/C14-1008.

\* cited by examiner

SENTIMENT ANALYSIS TUNING

The present disclosure relates generally to text analysis, and relates more particularly to devices, non-transitory computer-readable media, and methods for tuning techniques to recognize the sentiment expressed in a string of text.

BACKGROUND

Sentiment analysis (SA) refers to text analysis techniques that are used to automatically determine the sentiment (e.g., attitude) expressed in a string of text. For example, SA may be used to determine the attitude of a speaker or a writer with respect to some topic or to determine the overall contextual polarity or emotional reaction of the speaker or writer to a document, an interaction, or an event. The attitude may be an opinion, an affective state, or an intended emotional communication (e.g., the emotional effect intended by the speaker or writer).

SA may include the use of the use of natural language processing, text analysis, computational linguistics, and/or biometrics. Some SA techniques calculate a numerical score that quantifies the sentiment. For instance, a positive numerical score may indicate a positive sentiment (e.g., satisfied or happy), while a negative numerical score may indicate a negative sentiment (e.g., unhappy or dissatisfied). The magnitude of the numerical score may indicate a degree of the sentiment. In this case, a numerical score of zero may indicate a neutral sentiment.

SUMMARY

In one example, the present disclosure describes a device, computer-readable medium, and method for sentiment analysis tuning. In one example, the method, includes acquiring a first sentiment analysis-generated score for a first string of text, wherein the first string of text includes a first plurality of words, and wherein the first sentiment analysis-generated score is calculated using a set of first values associated with the first plurality of words, calculating a second value for at least one word of the first plurality of words, based on a non-sentiment-analysis generated score associated with the first string of text, acquiring a second string of text, wherein the second string of text includes a second plurality of words, and wherein the second plurality of words includes the at least one word, and calculating a sentiment analysis-generated score for the second string of text, using the second value for the at least one word.

In another example, a device includes a processor and a non-transitory computer-readable medium storing instructions which, when executed by the processor, cause the processor to perform operations. The operations include acquiring a first sentiment analysis-generated score for a first string of text, wherein the first string of text includes a first plurality of words, and wherein the first sentiment analysis-generated score is calculated using a set of first values associated with the first plurality of words, calculating a second value for at least one word of the first plurality of words, based on a non-sentiment-analysis generated score associated with the first string of text, acquiring a second string of text, wherein the second string of text includes a second plurality of words, and wherein the second plurality of words includes the at least one word, and calculating a sentiment analysis-generated score for the second string of text, using the second value for the at least one word.

In another example, a non-transitory computer-readable medium stores instructions which, when executed by a processor, cause the processor to perform operations. The operations include acquiring a first sentiment analysis-generated score for a first string of text, wherein the first string of text includes a first plurality of words, and wherein the first sentiment analysis-generated score is calculated using a set of first values associated with the first plurality of words, calculating a second value for at least one word of the first plurality of words, based on a non-sentiment-analysis generated score associated with the first string of text, acquiring a second string of text, wherein the second string of text includes a second plurality of words, and wherein the second plurality of words includes the at least one word, and calculating a sentiment analysis-generated score for the second string of text, using the second value for the at least one word.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
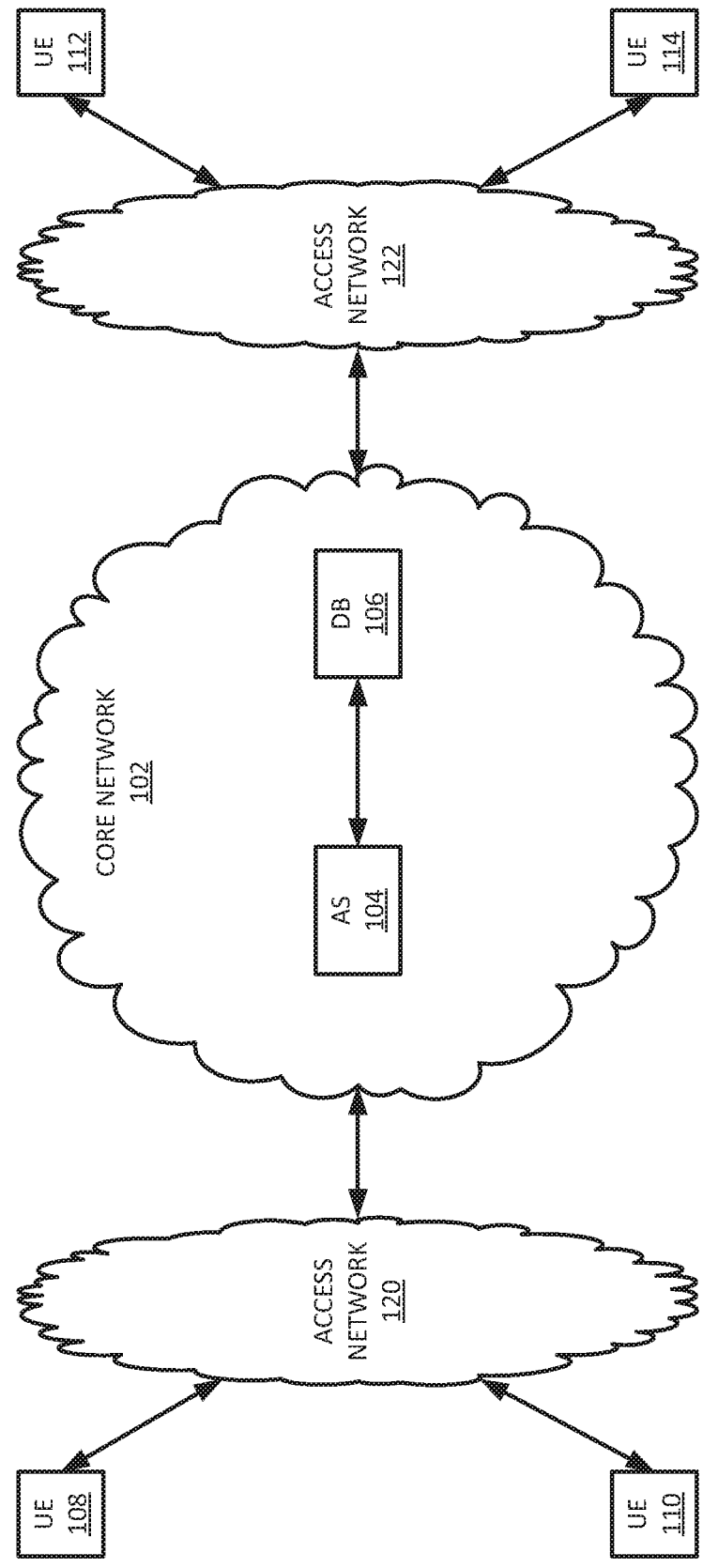
FIG. 1 illustrates an example network related to the present disclosure.

In one example, the present disclosure describes a method, apparatus, and non-transitory computer readable storage medium for sentiment analysis (SA) tuning. As discussed above, some SA techniques calculate a numerical score that quantifies the sentiment expressed in a string of text. For instance, one family of SA techniques assigns a numerical value to every possible word in a lexicon, where positive numerical values are assigned to words indicating positive sentiment, and negative numerical values are assigned to words indicating negative sentiment (a zero value may be assigned to words that are sentiment-neutral). The magnitude of the numerical value indicates the magnitude of the sentiment expressed. A string of text may then be scored by combining the values assigned to the individual words occurring in the string of text. The manner in which the values are combined may account for word proximity, ordering, negation (e.g., "not happy"), amplification (e.g., "very happy"), and the like. If a score calculated in this way is positive, this may indicate that the string of text expresses a positive sentiment (e.g., satisfied or happy); similarly, if a score calculated in this way is negative, this may indicate that the string of text expresses a negative sentiment (e.g., unhappy or dissatisfied). The magnitude of the numerical score may indicate a degree of the sentiment expressed (e.g., very positive, slightly positive, slightly negative, very negative, etc.).

The values assigned to the individual words in a lexicon may be adjusted to improve the accuracy of the sentiment analysis technique (e.g., to improve the accuracies of the scores produced by the sentiment analysis technique for strings of text). The process of adjusting the values may be referred to as "tuning." Tuning can be a challenging process. For instance, although a word may clearly indicate a positive or negative sentiment, the precise magnitude of the sentiment expressed (and, hence, the appropriate numerical value to be assigned to the word) may be less clear. This may be especially true in domains in which particular words may have unusual or counterintuitive meanings (for example, in the medical domain, the word "positive," when used to refer to the result of a medical test, may actually have a negative connotation). Conventional tuning approaches typically require some level of human effort, making them labor-intensive and somewhat subjective. For instance, some SA systems allow for manual (i.e., human-driven) tuning of values. Other SA systems enable machine-driven tuning, but rely on training examples that must be labeled by human operators.

Moreover, conventional SA tuning techniques tend to focus on purely text-based input. Thus, these conventional approaches fail to account for evidence received via other modalities (e.g., voice tones, facial expressions, gestures, etc.) in combination with the text, which may further indicate sentiment.

Examples of the present disclosure correlate non-SA-generated numerical scores with SA-generated scores for strings of text in order to tune the individual values for the words occurring in the strings of text. For instance, a customer survey may include a numerical score (e.g., on a scale from one to ten) indicating the customer's "willingness to recommend," while also including a verbatim explaining the numerical score (e.g., customer comments provided in a free-form, text-based format). Assuming that the "willingness to recommend" score is highly correlated with the sentiment expressed in the verbatim, the tuning process may be formed as an optimization problem that finds a set of values (for the individual words in the verbatim) that maximizes the correlation between an SA-generated score calculated using those values and the non-SA-generated (e.g., "willingness to recommend") score. Further examples of non-SA-generated scores may include ratings for products or services (e.g., as provided via a review on an ecommerce web site), social media responses (e.g., a number of "likes," replies, shares, reblogs, or the like), a click-through rate or click count of a web browser, the time watched for a video viewing event, the average time of viewing for a video viewing event, the completion rate for a video viewing event, the re-watch rate for a video viewing event, a rate of engagement in online activity (e.g., comments, shares, likes bookmarks, and the like), a number or type of subscriptions, a number or type of rentals, a number or type of purchases, a volume of laughter in a movie theater or similar setting, stock prices, or the like.

Still further examples of the present disclosure may derive non-SA-generated scores from evidence of sentiment received via non-text modalities in combination with a string of text, such as vocal tones, facial expressions, gestures and the like which can be recorded in an audio or video input (from which a text transcription may be generated). The evidence of sentiment received via non-text modalities may be used to tune the individual values for the words occurring in the string of text in the same way that a willingness to recommend score, product rating, or the like may be.

As such, while examples of the present disclosure are described within the context of "strings of text," it is understood that the strings of text may be derived from utterances or comments that are originally provided in a form other than text. For instance, a string of text could represent a comment provided by a writer in text form (e.g., a text message sent by phone, a survey response sent by computer, a social media posting, a closed captioning or subtitle track on a display, text displayed in an image, etc.). A string of text could also represent a transcription of a spoken utterance (e.g., a spoken comment or response provided via an interactive voice response system, a voice message left by phone, the audible portion of a video clip, etc.).

Within the context of the present disclosure, the term "value" is understood to refer to a numerical value that is assigned to an individual word in a lexicon. The value may be thought of as a weight that is applied to the sentiment associated with the word when calculating a sentiment analysis score for a string of text containing the word. A "score" is understood to refer to a numerical score that is calculated for a string of text, based on the values assigned to the individual words appearing in the string of text, to determine the overall sentiment expressed by the string of text. Examples of the present disclosure seek to tune the values assigned to individual words in order to improve the accuracies of the scores calculated by sentiment analysis techniques for the strings of text. An "SA-based" or "sentiment analysis-based" score is understood to refer to a numerical score that is calculated for a string of text using a sentiment analysis technique (e.g., a technique that combines values for individual words occurring in strings of text). A "non-SA-based" or "non-sentiment analysis-based" score is understood to refer to a numerical score that is correlated with a string of text, but that is calculated using a technique other than sentiment analysis.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one example, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single AS 104 and a single DB 106 are illustrated, it should be noted that any number of application servers 104 or databases 106 may be deployed. Furthermore, for ease of illustration, various additional elements of core network 102 are omitted from FIG. 1.

Figure 4:
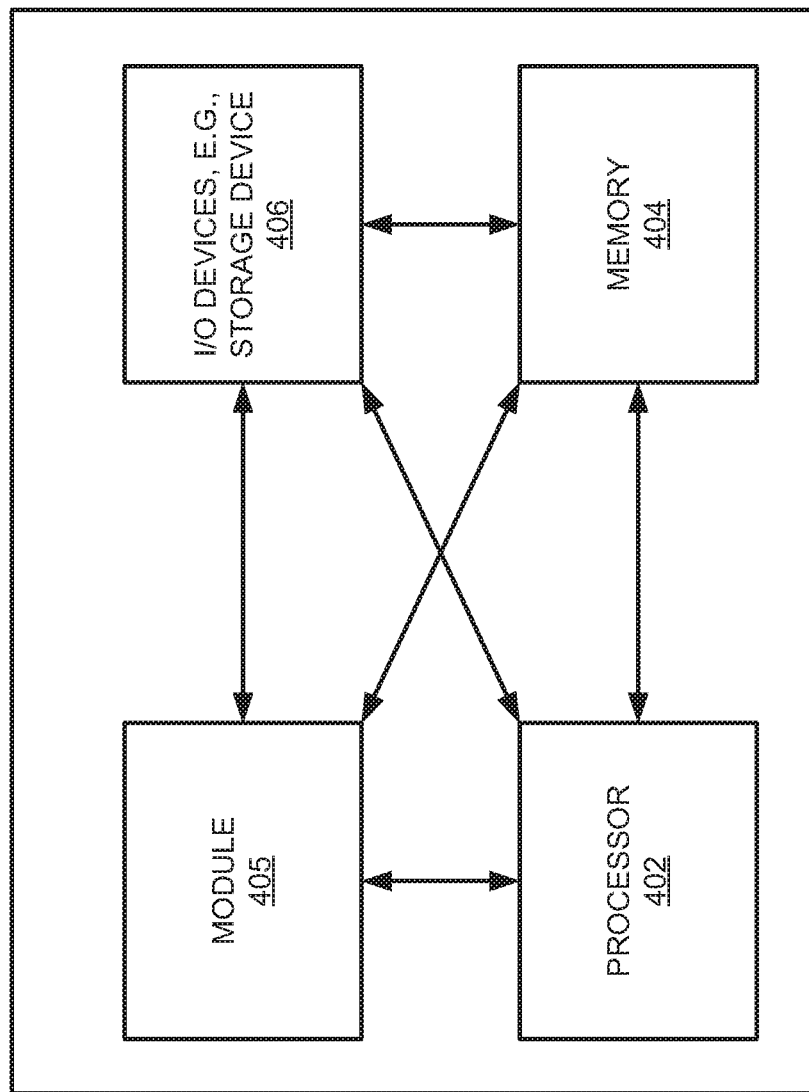
FIG. 4 depicts a high-level block diagram of a computing device specifically programmed to perform the functions described herein.

In one embodiment, the AS 104 may comprise a computing device specifically programmed to perform the functions described herein, as illustrated in FIG. 4 and discussed below. In one embodiment, the AS 104 may perform the methods discussed below related to sentiment analysis (SA) tuning. For instance, the AS 104 may adjust the values assigned to individual words in a lexicon, where the values are used by an SA technique to calculate sentiment scores for strings of text. In a further example, the AS 104 may also perform at least one SA technique for determining the sentiments expressed by strings of text.

In one example, the DB 106 may store data relating to strings of text, SA-generated scores for the strings of text (if available), and non-SA-generated scores associated with the strings of text (if available). The DB 106 may receive at least some of this data from the UEs 108, 110, 112, and 114, but may also receive some of the data from the AS 104. The DB 106 may also store data regarding at least one lexicon, such as the words included in the lexicon, numerical values assigned to the words for the purposes of SA, and any domain(s) to which the lexicon may be specific.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114. Access networks 120 and 122 may transmit and receive communications between respective UEs 108, 110, 112, and 114 and core network 102 relating to communications with web servers, AS 104, and/or other servers via the Internet and/or other networks, and so forth.

In one embodiment, the user endpoint devices 108, 110, 112, and 114 may be any type of subscriber/customer endpoint device configured for wired and/or wireless communication such as a desktop computer, a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box (STB), and the like. In one example, any one or more of the user endpoint devices 108, 110, 112, and 114 may have both cellular and non-cellular access capabilities and may further have wired communication and networking capabilities. It should be noted that although only four user endpoint devices are illustrated in FIG. 1, any number of user endpoint devices may be deployed.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, any one or more of the user endpoint devices 108, 110, 112, and 114 may host an operating system for presenting a user interface that may be used to send data to the AS 104 (e.g., strings of text and/or non-SA-generated scores) and for reviewing data sent by the AS 104 (e.g., SA-generated scores, etc.).

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
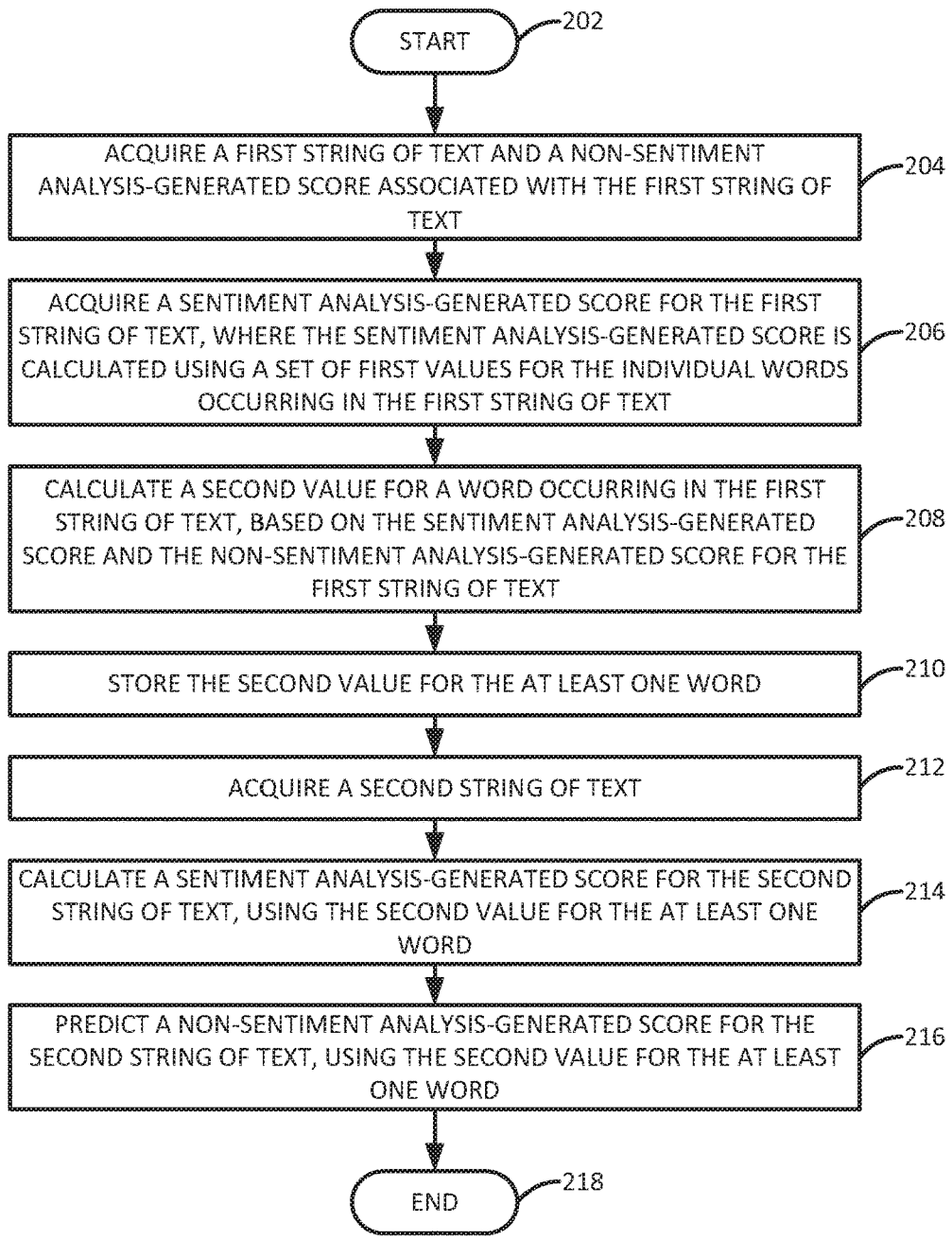
FIG. 2 illustrates a flowchart of an example method for sentiment analysis tuning.

To further aid in understanding the present disclosure, FIG. 2 illustrates a flowchart of an example method 200 for sentiment analysis tuning. In one example, the method 200 may be performed by an application server, e.g., AS 104 illustrated in FIG. 1 or the computing device 400 illustrated in FIG. 4. However, any references in the discussion of the method 200 to the AS 104 of FIG. 1 or the computing device 400 of FIG. 4 are not intended to limit the means by which the method 200 may be performed. For illustrative purposes, the method 200 is described in greater detail below in connection with an example performed by a processing system.

The method 200 begins in step 202. In step 204, the processing system may acquire a first string of text and a non-SA-generated score associated with the first string of text. For instance, the first string of text and the non-SA-generated score associated with the first string of text may comprise responses to a survey or another type of mechanism via which an individual can provide feedback (e.g., a numerical rating for a product or service and freeform comments explaining the numerical rating). The first string of text and the non-SA-generated score may be acquired directly from a user endpoint device (e.g., UEs 108, 110, 112, and/or 114), from a database (e.g., DB 106), or from another source.

As discussed above, the first string of text may represent a comment provided by a writer in text form (e.g., a text message sent by phone or an email message, comment, or response to a survey sent by computer, etc.). The first string of text could also represent a transcription of a spoken utterance (e.g., a spoken comment or response provided via an interactive voice response system, a voice message left by phone, the audible portion of a video clip, etc.). As such, the first string of text includes a first plurality of words.

In another example, the non-SA-generated score may comprise a representation of a multi-modal input associated with the string of text. For instance, the multi-modal input may comprise the visual portion of a video clip, the audio portion of a video clip or an audio recording, or the like (where the string of text may comprise a transcription of the video clip, audio recording, or the like). The multi-modal input may be pre-processed (e.g., using natural language processing, automatic speech recognition, sound spectral analysis, tone analysis, facial expression analysis, gesture recognition, and/or other techniques) and features (e.g., non-text features) may subsequently be extracted and represented as a vector. The vector may then be assigned a numerical score that indicates a sentiment expressed by the multi-modal input. In one example, a deep learning technique, such as a technique using a recurrent neural network (e.g., having a plurality of hidden layers with depths greater than one), is used to generate the numerical score for a vector.

In step 206, the processing system may also acquire a first SA-generated score for the first string of text acquired in step 204, where the first SA-generated score is calculated using a set of first values for the individual words (e.g., the first plurality of words) occurring in the first string of text. Each first value in the set of first values may be thought of as a weight that that is applied to the sentiment associated with a corresponding word when calculating the SA-generated score for the first string of text. Thus, each word in the first string of text may have a corresponding first value that is used to calculate the SA-generated score. The SA-generated score may be acquired from the same source as the first string of text and the non-SA-generated score. Alternatively, the processing system, if it has the capability, may calculate an SA-generated score for the first string of text using one or more SA techniques and the set of first values assigned to the individual words. The processing system may also send the first string of text to another device for calculation of the SA-generated score.

In step 208, the processing system may calculate a second value for at least one word appearing in the first string of text, based on the SA-generated score and the non-SA-generated score. The second value may replace the first value for the at least one word. That is, the second value may represent a new or updated weight to be applied to the sentiment associated with the at least one word when the at least one word appears in a future string of text.

In one example, the second value is calculated using a multidimensional optimization problem that finds a set of second values (for the individual words in the string of text) that maximizes the correlation between an SA-generated score calculated using the set of second values and the non-SA-generated score acquired in step 204. The optimization problem may be solved using any one or more of a number of approximation algorithms (e.g., hill climbing). The optimization problem may be tuned for a specific domain or context, so that the second value assigned to a given word accounts for any unusual or counterintuitive meanings the given word may have in the specific domain or context.

For instance, the crux of any machine learning algorithm is the concept of mathematical optimization, where a goal is to optimize (e.g., minimize or maximize) the value of an objective function with respect to the parameters of the objective function. As an example, consider the formula:

$$ax1+bx2+cx3=\text{score}1 \quad \text{(EQN. 1)}$$

where x1 is word1's frequency in a string of text, a is the value or weight assigned to word1, x2 is word2's frequency in the string of text, b the value or weight assigned to word2, x3 is word3's frequency in the string of text, c is the value or weight assigned to word3, and score1 is an SA-generated score estimating the sentiment expressed by the string of text. The values or weights a, b, and c may be tuned to optimize (e.g., minimize) a difference between score1 and a non-SA generated score (e.g., willingness to recommend) for the string of text.

In step 210, the processing system may store the second value for the at least one word. The second value may be stored, for example, in the DB 106 illustrated in FIG. 1. In one example, the second value overwrites the first value, i.e., so that the second value becomes the default value or weight for the at least one word for SA purposes.

In step 212, the processing system may acquire a second string of text. Similar to the first string of text, the second string of text may represent a comment provided by a writer in text form or a transcription of a spoken utterance. In one example, the at least one word for which the second value was calculated in step 208 appears in the second string of text as well as the first string of text In step 214, the processing system may calculate an SA-generated score for the second string of text, using the second value for the at least one word. That is, the at least one word may be weighted using the second value when the SA-generated score for the second string of text is calculated.

In step 216, the processing system may predict a non-SA-generated score for the second string of text, using the second value for the at least one word. Further details of a method for predicting a non-SA-generated score for a string of text are discussed below in connection with FIG. 3.

The method 200 may end in step 218.

Figure 3:
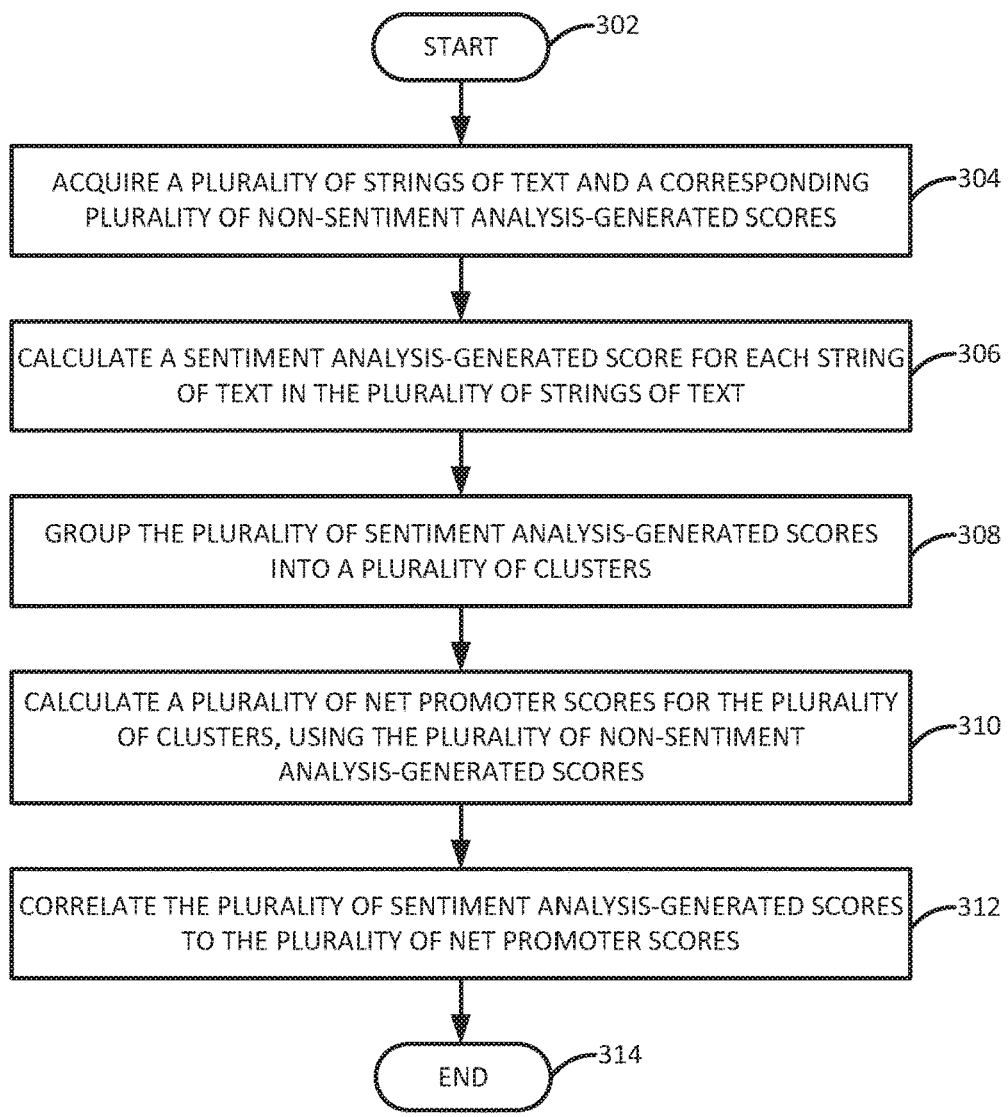
FIG. 3 illustrates a flowchart of an example method for predicting a non-sentiment analysis-generated score for a string of text, using a tuned sentiment analysis technique.

FIG. 3 illustrates a flowchart of an example method 300 for predicting a non-sentiment analysis-generated score for a string of text, using a tuned sentiment analysis technique. In one example, the method 300 may be performed by an application server, e.g., AS 104 illustrated in FIG. 1 or the computing device 400 illustrated in FIG. 4. However, any references in the discussion of the method 300 to the AS 104 of FIG. 1 or the computing device 400 of FIG. 4 are not intended to limit the means by which the method 300 may be performed. For illustrative purposes, the method 300 is described in greater detail below in connection with an example performed by a processing system.

In one example, the method 300 may be used to calculate what is known as a "net promoter score." A net promoter score may be calculated as a means of determining the loyalty of a service provider's customer base. A basic way of calculating a net promoter score is to subtract the percentage of customers that are considered to be detractors (or express negative sentiment about the service provider) from the percentage of customers that are considered to be promoters (or express positive sentiment about the service provider). In another example, the score calculated by the method 300 may be any numerical score or rating (e.g., a willingness to recommend score, a product rating, or the like) that is not already provided with a string of text.

The method 300 begins in step 302. In step 304, the processing system may acquire a plurality of strings of text and a corresponding plurality of non-SA-generated scores. In one example, each string of text in the plurality of strings of text represents a free-form response of an individual (e.g., a customer of a service provider) to a survey. Similarly, each non-SA-generated score corresponding to a string of text may represent a score an individual has provided for a particular measure (e.g., willingness to recommend, rating, or the like).

In step 306, the processing system may calculate an SA-generated score for each string of text in the plurality of strings of text, to produce a plurality of SA-generated scores. In one example, the SA-generated score for a string of text may be calculated as described above, e.g., by assigning a positive, negative, or neutral connotation to each word occurring in the string of text, and by weighting each word to indicate the magnitude of the sentiment indicated by the word. In one example, the values of the weights may be constrained to lie within a defined range (e.g., between −1 and +1) and may be tuned according to the method 200 described above. The sum of the values for all words occurring in a string of text (factoring in adjustments for negators, amplifiers, and de-amplifiers) may represent the SA-generated score for the string of text.

In step 308, the processing system may group the plurality of SA-generated scores for the plurality of strings of text into a plurality of clusters (where each cluster includes at least one SA-generated score of the plurality of SA-generated scores). Grouping the plurality of SA-generated scores may be accomplished by constraining the scores to lie within a defined range (e.g., −1 to +1) and rounding (e.g., to the nearest tenth). Like scores are grouped within a common cluster, where "like" may mean that the scores in the common cluster are identical.

In step 310, the processing system may calculate a net promoter for each cluster of the plurality of clusters (where each net promoter score corresponds to one cluster), using the non-SA generated scores corresponding to the SA-generated scores in the clusters. That is, for a given cluster, the SA-generated scores in the cluster will correspond to string of texts of the plurality of strings of text acquired in step 304. These strings of text will also correspond to non-SA-generated scores of the plurality of non-SA-generated scores, as noted in connection with step 304. Thus, in one example, the net promoter score for a given cluster can be calculated as described above (e.g., percentage of promoters minus percentage of detractors) using the non-SA-generated scores that correspond to the SA-generated scores in the given cluster.

In step 312, the processing system may correlate the plurality of (rounded) SA-generated scores for the clusters (as calculated in step 308) to the plurality net promoter scores for the clusters (as calculated in step 310). That is, the SA-generated score for a given cluster may be correlated with the net promoter score for that same given cluster.

The method 300 may end in step 314.

Thus, the methods 200 and 300 may allow a service provider to better understand and respond to "the voice of the customer" within surveys, social media, and the like. This, in turn, may allow the service provider to improve customer service, change processes to lower costs, increase customer satisfaction, and increase net promoter scores. Since the methods 200 and 300 may be fully automated, they can be performance responsively and without expending a significant amount of human effort.

In further examples still, examples of the methods 200 and 300 could be implemented to improve the responsiveness of a "chatbot," e.g., an interactive computer program that conducts conversations with customers (e.g., via auditory and/or textual modalities). For instance, a chatbot that has been trained on a tuned SA technique may be able to respond to a customer in a more personalized manner and may have more context awareness when conversing with the customer.

Although not expressly specified above, one or more steps of the methods 200 or 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the methods 200 or 300 may be implemented as the system 400. For instance, an application server could be implemented as illustrated in FIG. 4.

As depicted in FIG. 4, the system 400 comprises a hardware processor element 402, a memory 404, a module 405 for sentiment analysis tuning, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for sentiment analysis tuning may include circuitry and/or logic for performing special purpose functions relating to the tuning individual word weights used for sentiment analysis techniques. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for sentiment analysis tuning (e.g., a software program comprising computer-executable instructions) can be loaded into memory 404 and executed by hardware processor element 402 to implement the steps, functions or operations as discussed above in connection with the example methods 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for sentiment analysis tuning (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of the disclosure should not be limited by any of the above-described example examples, but should be defined only in accordance with the following claims and their equivalents.

What is claimed is:

1. A method, comprising:
   acquiring, by a processing system including at least one processor, a first sentiment analysis-generated score for a first string of text, wherein the first string of text includes a first plurality of words, and wherein the first sentiment analysis-generated score is calculated using a set of first values associated with the first plurality of words;
   calculating, by the processing system, a second value for at least one word of the first plurality of words, based on a first non-sentiment-analysis generated score associated with the first string of text;
   acquiring, by the processing system, a second string of text, wherein the second string of text includes a second plurality of words, and wherein the second plurality of words includes the at least one word;
   calculating, by the processing system, a second sentiment analysis-generated score for the second string of text, using the second value for the at least one word; and
   predicting, by the processing system, a second non-sentiment analysis-generated score associated with the second string of text, using the second value, wherein the second non-sentiment analysis-generated score is a net promoter score, wherein the second value is used to establish a correlation between a plurality of sentiment analysis-generated scores and a plurality of net promoter scores, wherein the correlation is established by:
   acquiring a plurality of strings of text and a plurality of non-sentiment analysis-generated scores, wherein each score of the plurality of non-sentiment analysis-generated scores corresponds to one string of text of the plurality of strings of text;
   calculating the plurality of sentiment analysis-generated scores using the second value, wherein each sentiment analysis-generated score of the plurality of sentiment analysis-generated scores corresponds to one string of text of the plurality of strings of text;
   grouping the plurality of sentiment analysis-generated scores into a plurality of clusters, wherein each cluster of the plurality of clusters represents one sentiment analysis-generated score of the plurality of sentiment analysis-generated scores; and
   calculating the plurality of net promoter scores using the plurality of non-sentiment analysis-generated scores, wherein each net promoter score of the plurality of net promoter scores corresponds to one cluster of the plurality of clusters.

2. The method of claim 1, wherein the first non-sentiment analysis generated score comprises a numerical score automatically derived from non-text features of a multi-modal input associated with the string of text.

3. The method of claim 2, wherein the multi-modal input comprises an audible input.

4. The method of claim 2, wherein the multi-modal input comprises a visual input.

5. The method of claim 2, wherein the numerical score is generated by:
   representing the non-text features as a vector; and
   assigning the numerical score to the vector using a deep learning technique.

6. The method of claim 1, wherein the first non-sentiment-analysis generated score comprises a numerical rating provided by a same source as the string of text.

7. The method of claim 1, wherein each value of the set of first values comprises a weight that implies a magnitude of a sentiment expressed by a corresponding word of the first plurality of words.

8. The method of claim 7, wherein the second value comprises an adjusted weight that implies a magnitude of a sentiment expressed by the at least one word.

9. The method of claim 7, wherein the first sentiment analysis-generated score is calculated by combining values of the set of first values that correspond to the first plurality of words.

10. The method of claim 1, wherein the calculating the second value for the at least one word is performed using a multidimensional optimization problem that finds a set of second values including the second value, and wherein the set of second values, when applied to the first plurality of words, maximizes a correlation between the first sentiment analysis-generated score and the first non-sentiment analysis-generated score.

11. The method of claim 10, wherein the multidimensional optimization problem is tuned for a specific domain.

12. The method of claim 1, wherein the second string of text comprises a survey response provided by a customer of a service provider.

13. The method of claim 1, wherein each sentiment analysis-generated score of the plurality of sentiment analysis-generated scores that is included in a given cluster of the plurality of clusters has an identical score.

14. The method of claim 1, wherein the calculating the plurality of net promoter scores for a given cluster of the plurality of clusters is based on non-sentiment analysis-generated scores of the plurality of non-sentiment analysis-generated scores corresponding to strings of text of the plurality of strings of text that are represented by sentiment analysis-generated scores of the plurality of sentiment analysis-generated scores that are included in the given cluster.

15. A device, comprising:
a processor; and
a non-transitory computer-readable medium storing instructions which, when executed by the processor, cause the processor to perform operations comprising:
acquiring a first sentiment analysis-generated score for a first string of text, wherein the first string of text includes a first plurality of words, and wherein the first sentiment analysis-generated score is calculated using a set of first values associated with the first plurality of words;
calculating a second value for at least one word of the first plurality of words, based on a non-sentiment-analysis generated score associated with the first string of text;
acquiring a second string of text, wherein the second string of text includes a second plurality of words, and wherein the second plurality of words includes the at least one word;
calculating a sentiment analysis-generated score for the second string of text, using the second value for the at least one word; and
predicting a second non-sentiment analysis-generated score associated with the second string of text, using the second value, wherein the second non-sentiment analysis-generated score is a net promoter score, wherein the second value is used to establish a correlation between a plurality of sentiment analysis-generated scores and a plurality of net promoter scores, wherein the correlation is established by:
acquiring a plurality of strings of text and a plurality of non-sentiment analysis-generated scores, wherein each score of the plurality of non-sentiment analysis-generated scores corresponds to one string of text of the plurality of strings of text;
calculating the plurality of sentiment analysis-generated scores using the second value, wherein each sentiment analysis-generated score of the plurality of sentiment analysis-generated scores corresponds to one string of text of the plurality of strings of text;
grouping the plurality of sentiment analysis-generated scores into a plurality of clusters, wherein each cluster of the plurality of clusters represents one sentiment analysis-generated score of the plurality of sentiment analysis-generated scores; and
calculating the plurality of net promoter scores using the plurality of non-sentiment analysis-generated scores, wherein each net promoter score of the plurality of net promoter scores corresponds to one cluster of the plurality of clusters.

16. A non-transitory computer-readable medium storing instructions which, when executed by a processor, cause the processor to perform operations comprising:
acquiring a first sentiment analysis-generated score for a first string of text, wherein the first string of text includes a first plurality of words, and wherein the first sentiment analysis-generated score is calculated using a set of first values associated with the first plurality of words;
calculating a second value for at least one word of the first plurality of words, based on a non-sentiment-analysis generated score associated with the first string of text;
acquiring a second string of text, wherein the second string of text includes a second plurality of words, and wherein the second plurality of words includes the at least one word;
calculating a sentiment analysis-generated score for the second string of text, using the second value for the at least one word; and
predicting a second non-sentiment analysis-generated score associated with the second string of text, using the second value, wherein the second non-sentiment analysis-generated score is a net promoter score, wherein the second value is used to establish a correlation between a plurality of sentiment analysis-generated scores and a plurality of net promoter scores, wherein the correlation is established by:
acquiring a plurality of strings of text and a plurality of non-sentiment analysis-generated scores, wherein each score of the plurality of non-sentiment analysis-generated scores corresponds to one string of text of the plurality of strings of text;
calculating the plurality of sentiment analysis-generated scores using the second value, wherein each sentiment analysis-generated score of the plurality of sentiment analysis-generated scores corresponds to one string of text of the plurality of strings of text;
grouping the plurality of sentiment analysis-generated scores into a plurality of clusters, wherein each cluster of the plurality of clusters represents one sentiment analysis-generated score of the plurality of sentiment analysis-generated scores; and
calculating the plurality of net promoter scores using the plurality of non-sentiment analysis-generated scores, wherein each net promoter score of the plurality of net promoter scores corresponds to one cluster of the plurality of clusters.

17. The non-transitory computer-readable medium of claim 16, wherein the first non-sentiment analysis generated score comprises a numerical score automatically derived from non-text features of a multi-modal input associated with the string of text.

18. The non-transitory computer-readable medium of claim 16, wherein the second string of text comprises a survey response provided by a customer of a service provider.

19. The non-transitory computer-readable medium of claim 16, wherein each sentiment analysis-generated score of the plurality of sentiment analysis-generated scores that is included in a given cluster of the plurality of clusters has an identical score.

20. The non-transitory computer-readable medium of claim 16, wherein the calculating for a given cluster of the plurality of clusters is based on non-sentiment analysis-generated scores of the plurality of non-sentiment analysis-generated scores corresponding to strings of text of the plurality of strings of text that are represented by sentiment analysis-generated scores of the plurality of sentiment analysis-generated scores that are included in the given cluster.

* * * * *